United States Patent
Lipman et al.

(10) Patent No.: US 7,891,630 B2
(45) Date of Patent: Feb. 22, 2011

(54) ELECTRONIC EQUIPMENT CONSOLE FOR A VEHICLE

(75) Inventors: Shelley Rosenbaum Lipman, Billerica, MA (US); Frank P. LaBarba, Newburyport, MA (US); Bruce C. Stacey, North Billerica, MA (US)

(73) Assignee: Raytheon Company, Waltham, MA (US)

( * ) Notice: Subject to any disclaimer, the term of this patent is extended or adjusted under 35 U.S.C. 154(b) by 585 days.

(21) Appl. No.: 11/517,134

(22) Filed: Sep. 6, 2006

(65) Prior Publication Data
US 2008/0054145 A1    Mar. 6, 2008

(51) Int. Cl.
A47G 29/00    (2006.01)
A47B 23/00    (2006.01)

(52) U.S. Cl. .................. 248/371; 370/188.2; 370/919; 108/44

(58) Field of Classification Search .............. 248/274.1, 248/276.1, 917–923, 176.1, 125.7, 133, 370, 248/371.1, 398, 242, 250, 441.1, 188.2, 180.1; 108/23, 24, 25, 44, 138, 145, 147.11, 147.17; 312/208.1, 209, 223.3, 281, 317.3, 314; 361/681–683; 297/174 R, 153, 161
See application file for complete search history.

(56) References Cited

U.S. PATENT DOCUMENTS

| 4,909,159 | A | * | 3/1990 | Gonsoulin | 108/44 |
| 4,934,933 | A | * | 6/1990 | Fuchs | 312/209 |
| RE34,266 | E | * | 6/1993 | Schairbaum | 312/208.1 |
| 5,261,735 | A | * | 11/1993 | Cohen et al. | 312/282 |
| 5,390,764 | A | * | 2/1995 | Kerber | 248/287.1 |
| 5,655,823 | A | * | 8/1997 | Schairbaum | 248/286.1 |
| 5,673,628 | A | * | 10/1997 | Boos | 108/44 |
| 5,765,797 | A | * | 6/1998 | Greene et al. | 248/923 |
| 6,055,911 | A | * | 5/2000 | Krenzer | 108/44 |
| 6,152,046 | A | * | 11/2000 | Schairbaum et al. | 108/25 |
| 6,382,745 | B1 | * | 5/2002 | Adkins | 312/223.3 |
| 6,491,268 | B1 | * | 12/2002 | Channer et al. | 248/176.1 |
| 6,712,068 | B1 | * | 3/2004 | Yeung | 126/299 E |
| 6,796,536 | B1 | * | 9/2004 | Sevier, IV | 248/121 |
| 7,293,751 | B2 | * | 11/2007 | Eriksson | 248/346.01 |
| 7,611,112 | B2 | * | 11/2009 | Lin | 248/274.1 |
| 2005/0225217 | A1 | | 10/2005 | Nay et al. | |
| 2006/0158836 | A1 | | 7/2006 | Phillips | |
| 2008/0054145 | A1 | * | 3/2008 | Lipman et al. | 248/242 |

* cited by examiner

*Primary Examiner*—Tan Le
(74) *Attorney, Agent, or Firm*—Iandiorio Teska & Coleman

(57) ABSTRACT

An electronic equipment console for a vehicle includes an equipment shelf supported by a bracket and defining a plane. A laptop rack is supported by the equipment shelf and is oriented relative to the defined plane thereof to be elevated, pitched upwardly and rearwardly, rotated, and tilted.

15 Claims, 9 Drawing Sheets

US 7,891,630 B2

ELECTRONIC EQUIPMENT CONSOLE FOR A VEHICLE

GOVERNMENT RIGHTS

This invention was made with U.S. Government support under Contract No. W31P4Q-04-C-0005 (SLAMRAAM) awarded by the United States Army. The Government may have certain rights in the subject invention.

FIELD OF THE INVENTION

This subject invention relates to a console for mounting electronic equipment in the interior of a vehicle.

BACKGROUND OF THE INVENTION

The use of portable computers to access data or input information or commands has become an integral part of law enforcement and military operations, and the use of computers or laptops in police or military vehicles is known. Although computer size has decreased, there is a limit to how small such a portable computer may be in order to satisfy the needs of a particular undertaking. Therefore, factors to be considered in the placement of an in-vehicle computer include accessibility and the overall safety of the vehicle's driver or passengers. The computer or laptop must be placed so that the vehicle operator or passenger can see it and use the keyboard and touchscreen, yet its positioning should not inhibit the ability to freely enter and exit the vehicle or see outside.

Achieving easy access to the in-vehicle computer or laptop while maintaining good visibility and easy egress from the vehicle is an important but not trivial task.

Requiring the driver or passenger to hold the computer or laptop in their lap while in a vehicle is unsatisfactory and cumbersome, and interferes with all activities as well ingress and egress.

Simply mounting the computer at right angles to the dashboard next to the computer operator restricts access to the computer by requiring the operator to turn to the side and/or causing awkward positioning of the wrists, hips or head. In such a case the screen or monitor can impede the view to the front or side of the vehicle, and information displayed on the screen may be readily visible from outside of the vehicle.

Alternatively, placing the computer in front of a passenger also has disadvantages. Some vehicles have very limited cab space, such as a HMMWV (High Mobility Multi-Purpose Wheeled Vehicle) used for the SLAMRAAM (Surface Launched Advanced Medium Range Air-to-Air Missile) Fire Unit. Nearly all the available space in such a vehicle is occupied with electronic and other equipment. See, e.g. FIG. 1 showing the vehicle cab layout for such a HMMWV. Additionally, a law enforcement or military passenger may be wearing protective or combat gear such as a Load-Bearing Vest or Interceptor Body Armor. In either case, placing the computer in front of the passenger would not allow sufficient clearance for quick egress. Moreover, the passenger's and driver's view outside would be greatly obstructed.

Thus, it is clear that improper placement of a computer within a vehicle would not only be cumbersome, but could compromise passenger and driver safety as well as the success of a military mission.

SUMMARY OF THE INVENTION

It is therefore an object of this invention to provide an improved vehicle console for mounting electronic equipment such as a laptop computer.

It is a further object of this invention to provide such an improved electronic equipment vehicle console which is more easily accessible to the equipment operator.

It is a further object of this invention to provide such an improved electronic equipment vehicle console which provides decreased obstruction of views outside of the vehicle.

It is a further object of this invention to provide such an improved electronic equipment vehicle console which provides decreased obstruction of egress from the vehicle.

It is a further object of this invention to provide such an improved electronic equipment vehicle console which provides increased safety for the vehicle occupants.

The subject invention results from the realization that improved placement of electronic equipment such as a laptop computer within a vehicle can be achieved by a compound angle mounting system for mounting the equipment or laptop. The subject invention results from the further realization that such a mounting system can be achieved by an electronic vehicle console including an equipment shelf which defines a plane, and a rack supported by the equipment shelf which is oriented relative thereto so as to be elevated, pitched upwardly and rearwardly, rotated, and tilted with respect to the plane defined by the equipment shelf.

The subject invention, however, in other embodiments, need not achieve all these objectives and the claims hereof should not be limited to structures or methods capable of achieving these objectives.

This invention features an electronic equipment console for a vehicle including an equipment shelf supported by a bracket and defining a plane. A laptop rack is supported by the equipment shelf and oriented relative to the defined plane thereof to be elevated, pitched upwardly and rearwardly, rotated, and tilted. The bracket may extend rearwardly from the shelf and be angled upwardly with respect to the plane. The equipment shelf may be supported by one or more legs. The plane may be horizontal, and the console may include two front legs. In one example, the shelf has a side extension portion for supporting the laptop rack, and the laptop rack may include a mounting pad thereon. The laptop rack may be fixed with respect to the equipment shelf.

In one variation, the laptop rack is pitched upwardly and rearwardly at an angle of between 18.8° and 28.8°, is rotated at an angle of between 34.4° and 44.4°, and is tilted at an angle of between 2.1° and 12.1°. The laptop rack front portion is typically elevated above the equipment shelf. In one preferred embodiment, the center of the laptop rack is elevated above a seat pan of the vehicle between 11.6 inches and 18.6 inches, where the seat pan use for height purposes is typically the vehicle operator seat pan.

In one example, the laptop rack is supported by posts extending between the laptop rack and the equipment shelf, which may include right and left forward posts and right and left more rearwardly spaced posts. The left forward post may be shorter than the right rearward post to tilt the laptop rack.

The left more rearwardly post may be longer than the left forward post to pitch the laptop rack upwardly and rearwardly. The right more rearwardly post may extend to the equipment shelf bracket. If the laptop needs to be removable, the laptop rack may include clamps for securing a laptop computer to the laptop rack.

This invention also features an electronic equipment console for a vehicle including an equipment shelf supported by a bracket and defining a plane. A laptop rack is supported by the equipment shelf and oriented relative to the defined plane thereof to be elevated, pitched upwardly and rearwardly at an angle between 18.8° and 28.8°, rotated at an angle between 34.4° and 44.4°, and tilted at an angle between 2.1° and 12.1°.

This invention further features an electronic equipment console for a vehicle including an equipment shelf supported by a bracket and defining a plane. A laptop rack is supported by the equipment shelf and includes right and left forward posts and right and left more rearwardly spaced posts. The left forward post is shorter than the right rearward post to tilt the laptop rack. The left more rearwardly post is longer than the left forward post to pitch the laptop rack upwardly and rearwardly. Overall, the laptop rack is oriented relative to the defined plane of the equipment shelf to be elevated, pitched upwardly and rearwardly, rotated, and tilted.

This invention further features an electronic equipment console for an HMMWV including an equipment shelf supported by a bracket and defining a plane. A laptop rack is supported by the equipment shelf and oriented relative to the defined plane thereof to be elevated, pitched upwardly and rearwardly, and rotated and tilted. The laptop rack is pitched upwardly and rearwardly at an angle between 18.8° and 28.8°, rotated at an angle between 34.4° and 44.4°, and tilted at an angle between 2.1° and 12.1°. In one preferred example, the center of the laptop rack is 16.6 inches above a seat pan of the HMMWV, where the seat pan is typically considered to be the HMMWV operator seat pan.

BRIEF DESCRIPTION OF THE DRAWINGS

Other objects, features and advantages will occur to those skilled in the art from the following description of a preferred embodiment and the accompanying drawings, in which.

DISCLOSURE OF THE PREFERRED EMBODIMENT

Figure 1:
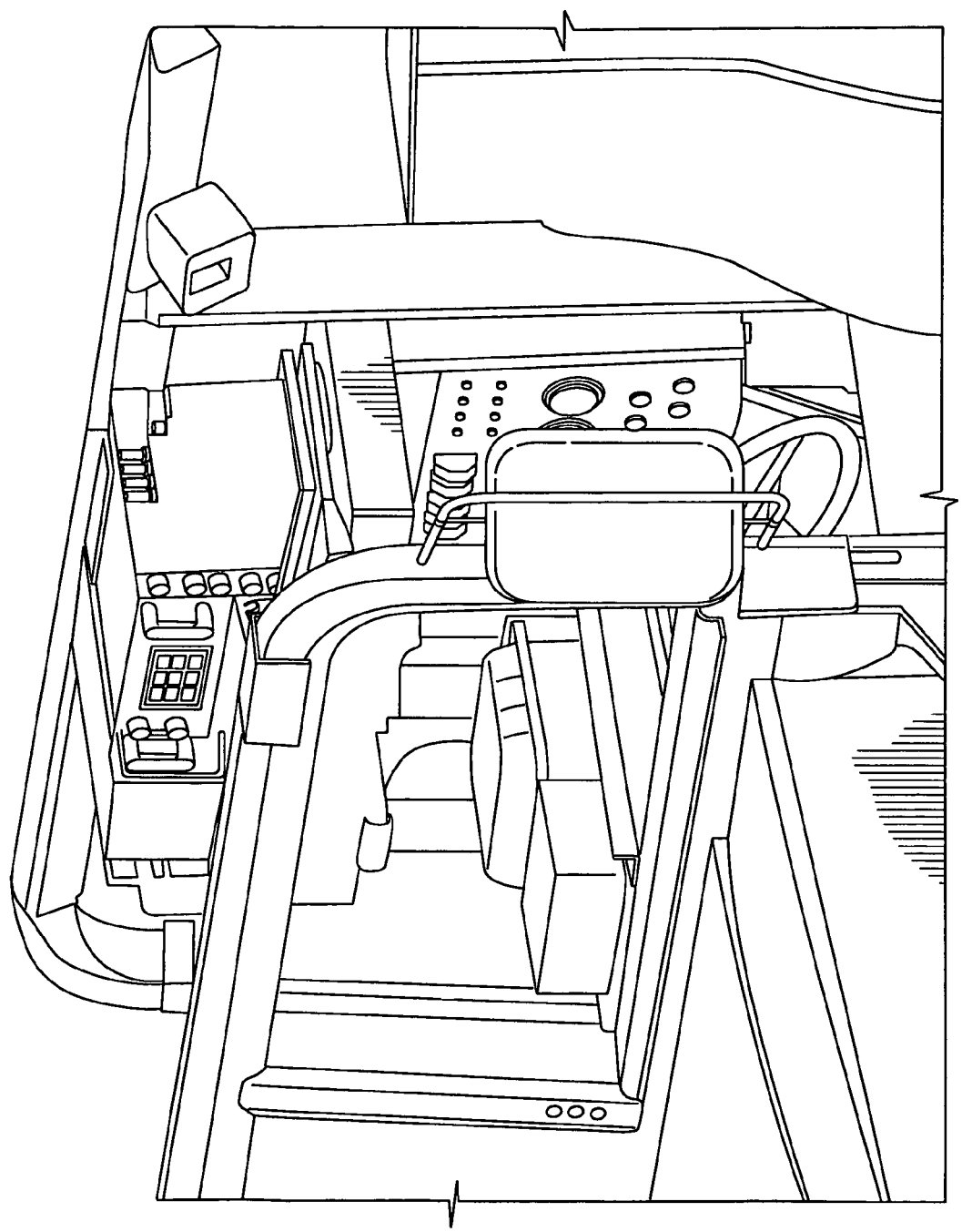
FIG. 1 is a schematic view of an example of an interior cab layout for a military HMMWV.

Aside from the preferred embodiment or embodiments disclosed below, this invention is capable of other embodiments and of being practiced or being carried out in various ways. Thus, it is to be understood that the invention is not limited in its application to the details of construction and the arrangements of components set forth in the following description or illustrated in the drawings. If only one embodiment is described herein, the claims hereof are not to be limited to that embodiment. Moreover, the claims hereof are not to be read restrictively unless there is clear and convincing evidence manifesting a certain exclusion, restriction, or disclaimer.

As discussed in the Background section above, electronic equipment such as computers and laptops are often used in military or law enforcement vehicles to receive information or issue mission commands. Placement and orientation of the equipment in the vehicle is key, and improved placement of the electronic equipment within the vehicle can be achieved by a compound angle mounting system, particularly, an electronic equipment vehicle console.

Figure 2:
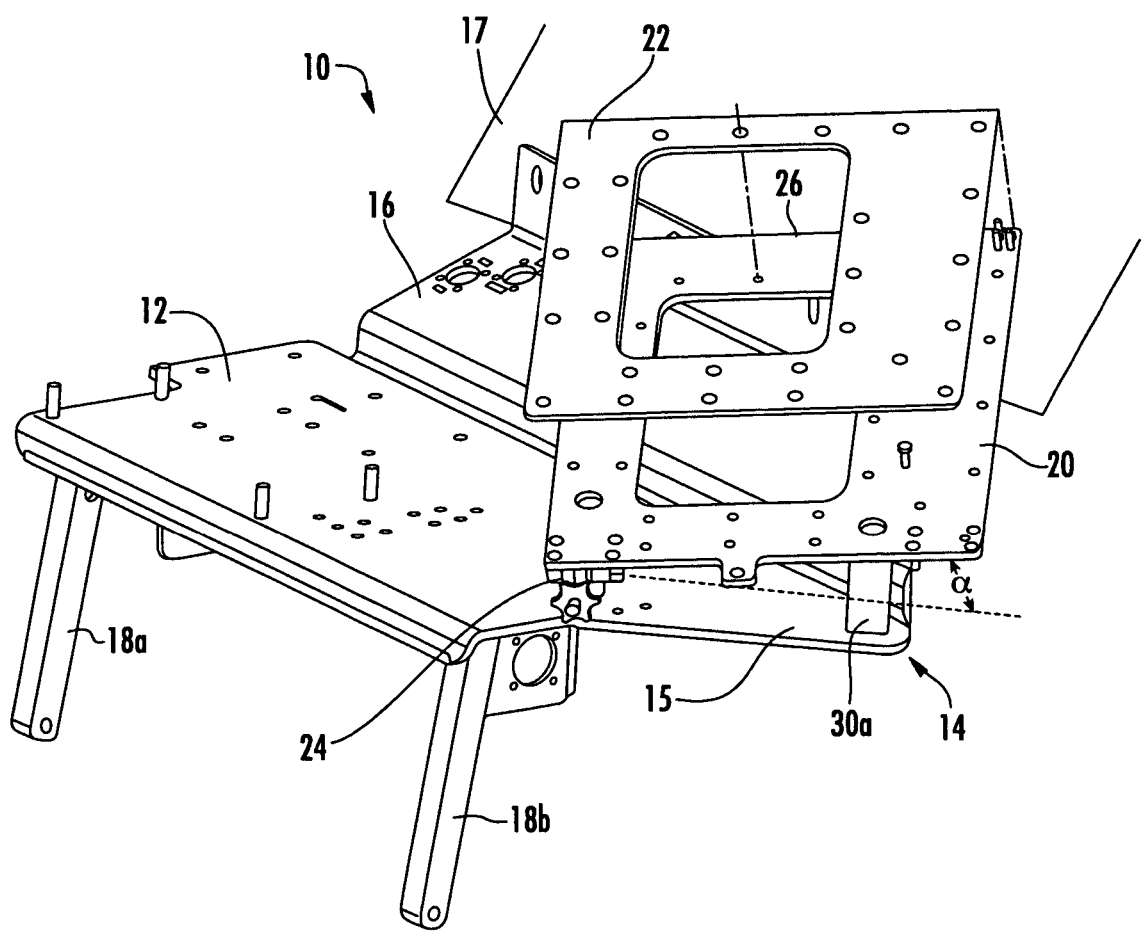
FIG. 2 is a schematic view of one embodiment an electronic equipment console for a vehicle in accordance with the present invention.

One example of such an electronic equipment vehicle console 10 in accordance with the present invention is shown in FIG. 2. Equipment shelf 12 typically defines a horizontal plane 14 and is supported by angled bracket 16. One or more legs 18a and 18b may be included for additional support.

Bracket 16 may be attached directly or indirectly to the interior dashboard 17 of the vehicle where console 10 is used. In the example shown, bracket 16 extends rearwardly from equipment shelf 12 and is angled upwardly with respect to plane 14.

Computer or laptop rack 20 is supported by equipment shelf 12 and is oriented relative to defined plane 14 such that laptop rack 20 is elevated therefrom. Equipment shelf 12 may include side extension portion 15 to support laptop rack 20, and in one example, laptop rack 20 is fixed with respect to equipment shelf 12. To provide a softer surface for laptop, mounting pad 22 may be added.

Figure 3:
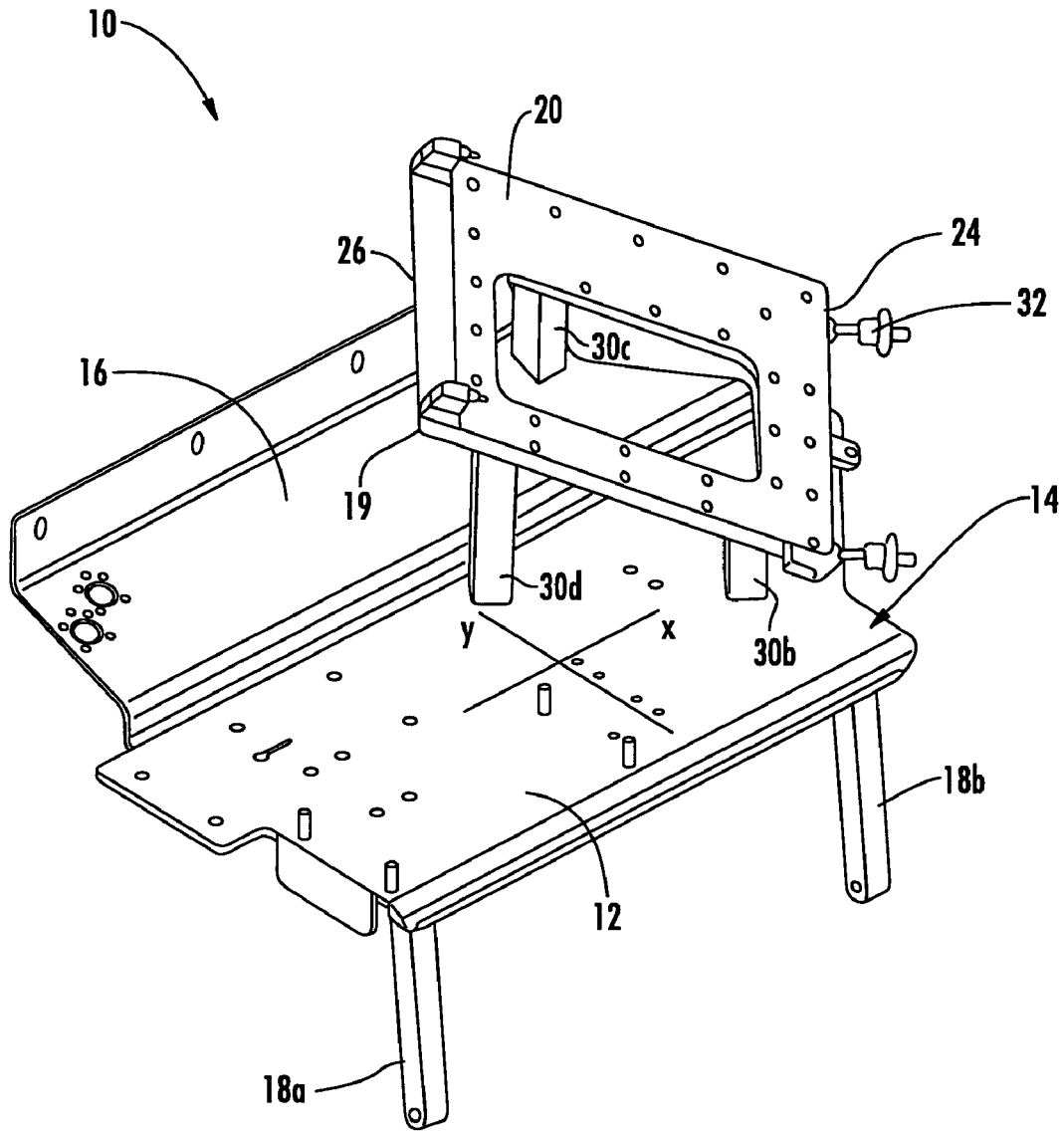
FIG. 3 is another schematic view of the electronic equipment console of FIG. 2.

In one example laptop rack 20 is supported by posts 30 which extend between laptop rack 20 and equipment shelf 12, including right forward post 30a, FIG. 2, left forward post 30b, FIG. 3, and right and left more rearwardly posts 30c and 30d, where right and left are defined from the perspective of the computer or SLAMRAAM operator when facing laptop rack 20. Right rearwardly post 30c extends to equipment shelf bracket 16. To tilt laptop rack 20, left forward post 30b is shorter than right rearward post 30c. To pitch laptop rack 20 upwardly and rearwardly, left more rearwardly post 30d is longer than left forward post 30b. The number of and lengths of posts may be varied, or other means may be used depending on a particular application, and the four post embodiment shown is not a necessary limitation of the invention.

Figure 4A:
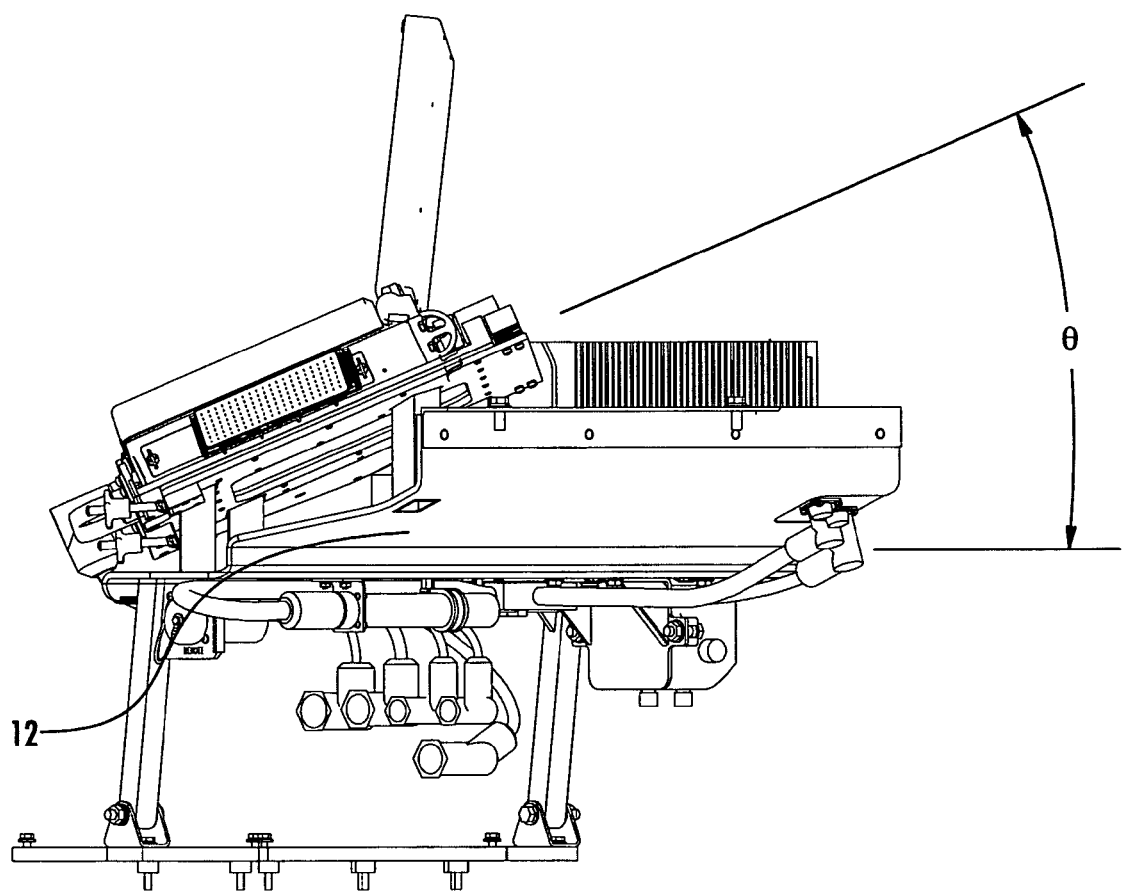
FIGS. 4A-4C are schematic views of the electronic equipment console of the present invention showing orientation angles.
Figure 4B:
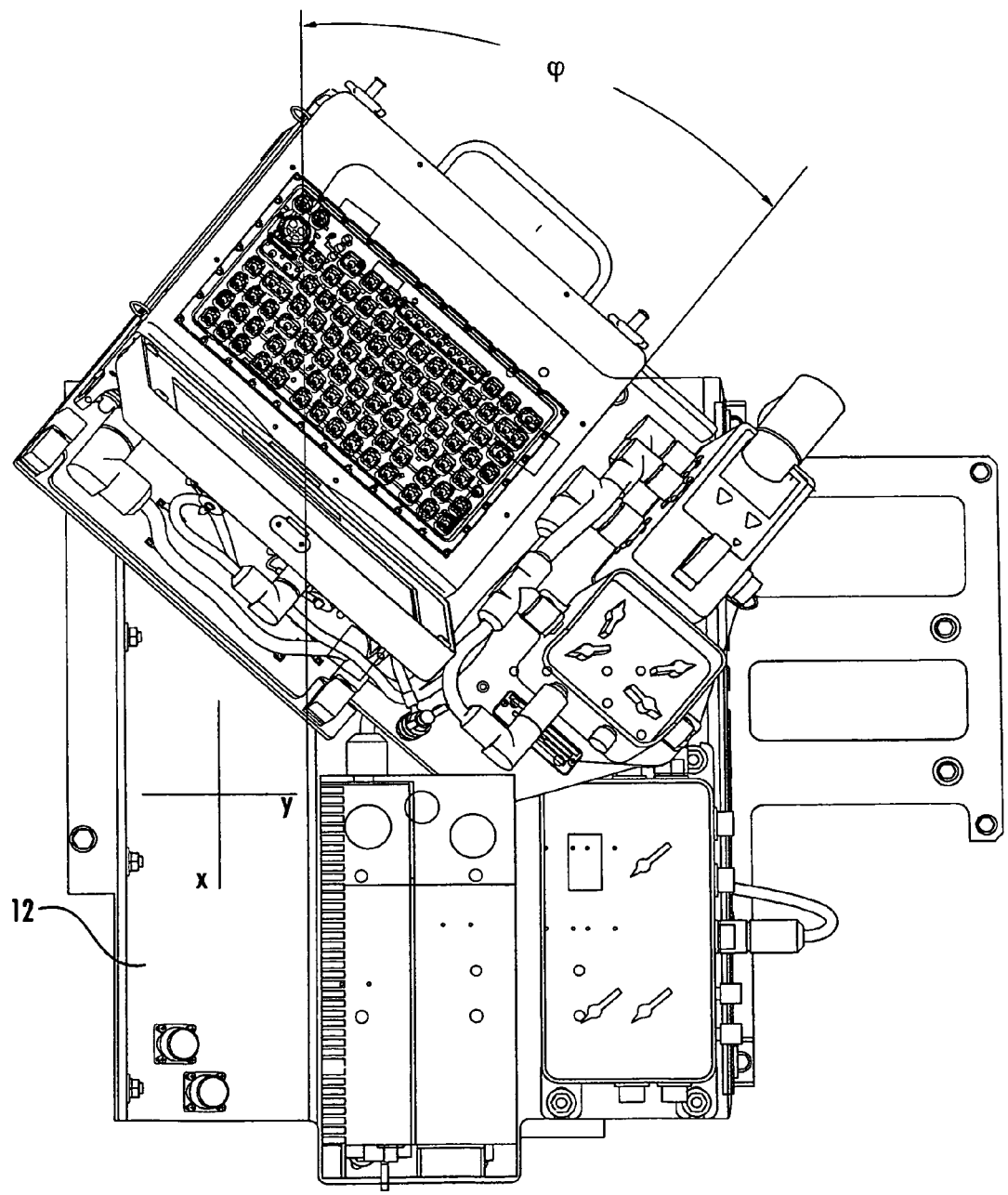
Figure 4C:
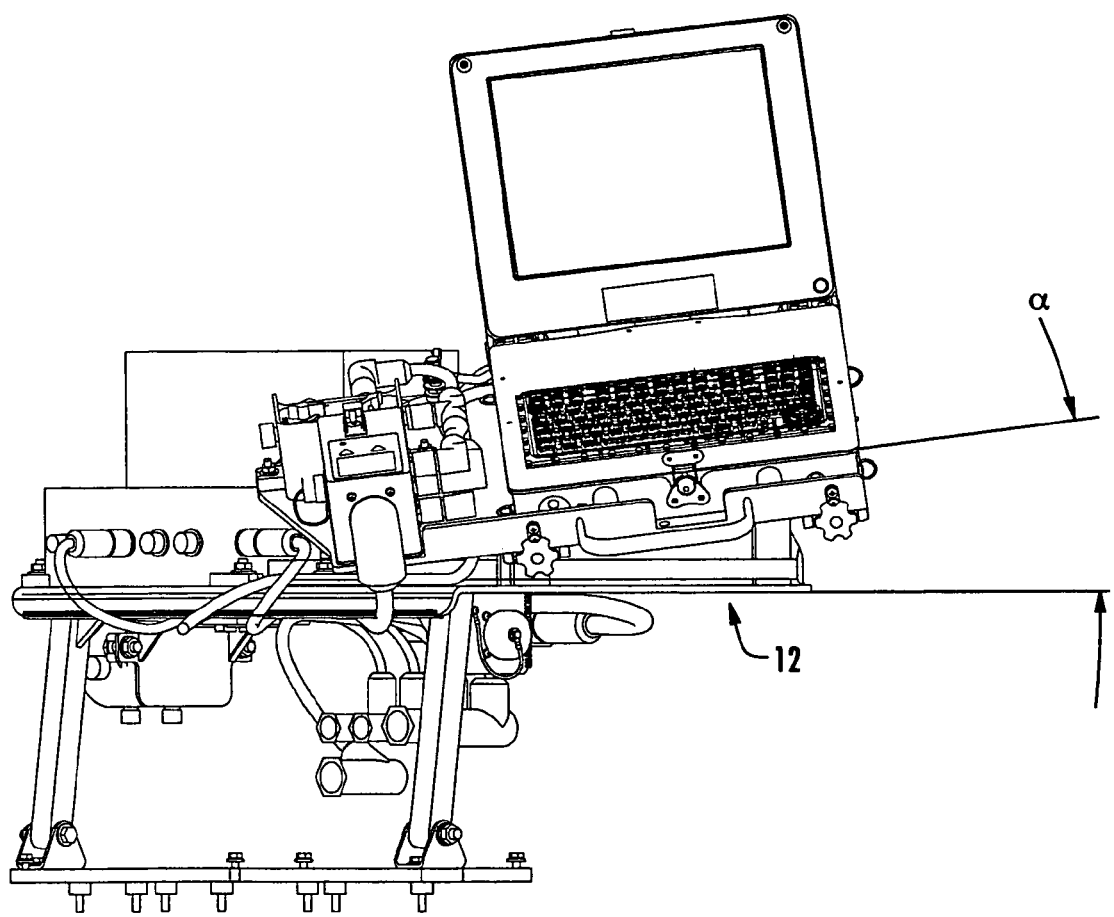

In accordance with the present invention, laptop rack 20, FIG. 3 is pitched upwardly and rearwardly, rotated, and tilted with respect to the plane of shelf 12 defined by axis X and Y. In one embodiment, laptop rack 20 is pitched upwardly and rearwardly at an angle θ, FIG. 4A, between 18.8° and 28.8° degrees relative to the plane of shelf 12, rotated at an angle φ, FIG. 4B, between 34.4° and 44.4° degrees relative to the X-axis, and tilted at an angle α, FIG. 4C, between 2.1° and 12.1° degrees relative to the plane of shelf 12. In one variation, laptop rack is pitched upwardly and rearwardly, rotated, and tilted at angles of approximately 23.8°, 39.4°, and 7.1° respectively.

Figure 5:
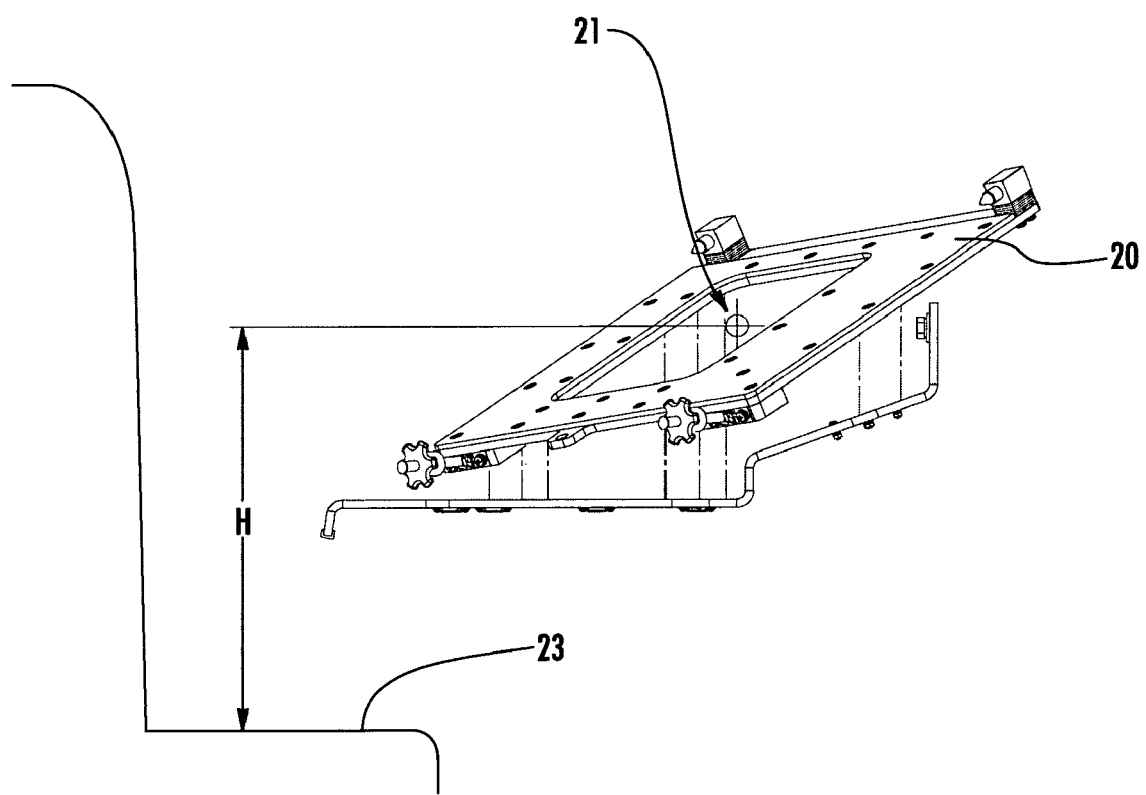
FIG. 5 is a schematic view of the electronic equipment console of the present invention shown in relation to the vehicle seat pan.

In one preferred embodiment, center 21 of laptop rack 20, FIG. 5 is elevated at a height H of between 11.6 inches and 18.6 inches above the center 23 of the vehicle operator's seat pan, and a height H of approximately 16.6 inches is particularly suitable for increased visibility and ergonomics. Center 21 of laptop 20 is defined herein as the geometrical center of laptop rack 20, not necessarily the physical center of laptop rack 20 such as when laptop rack 20 defines a perimeter area with no center portion as shown in the figures. Accordingly, the subject invention orients laptop rack 20 within any vehicle by pitch angle θ, rotation angle φ, tilt angle α, and height H.

Figure 6:
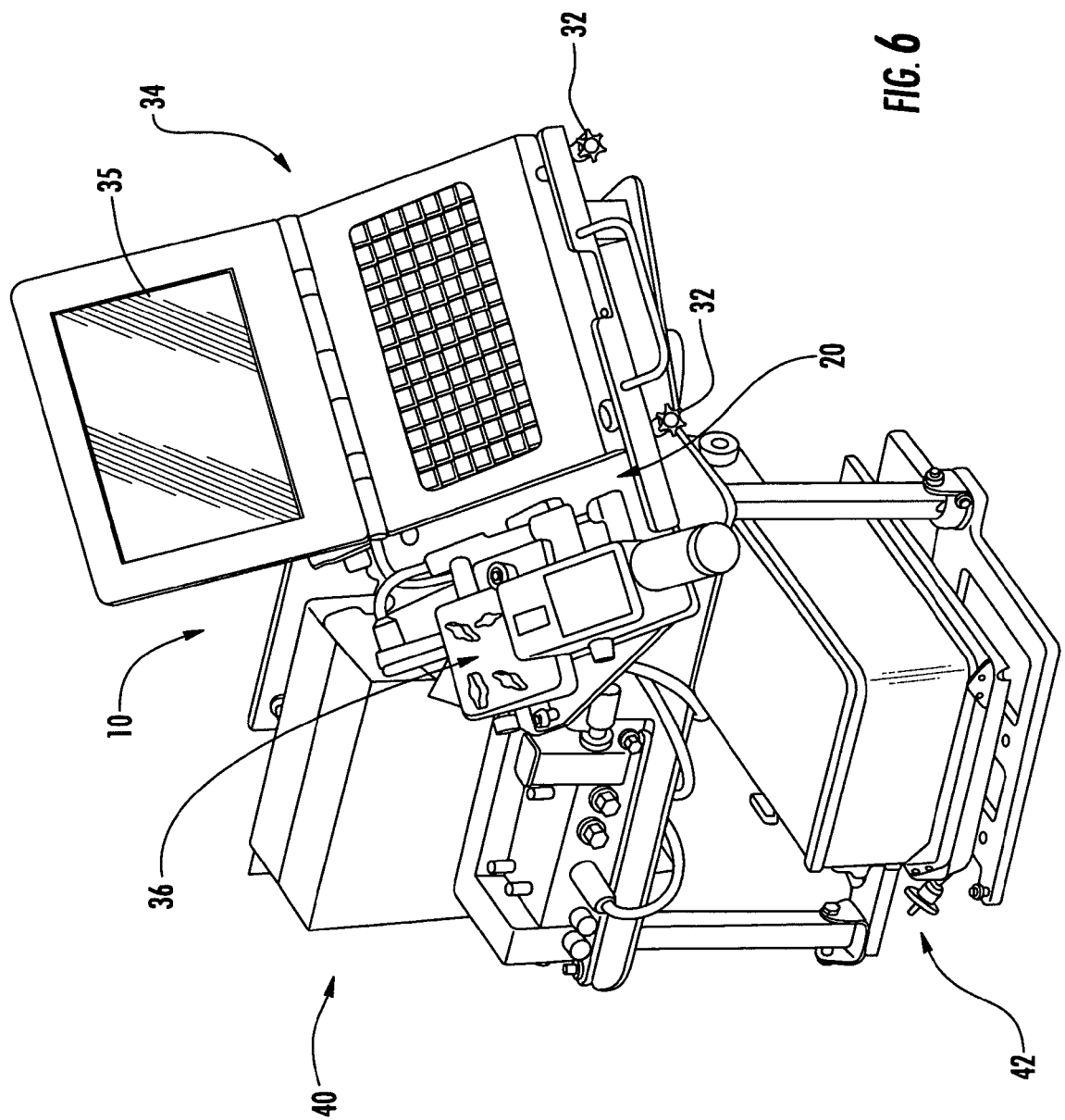
FIG. 6 is another schematic view of an electronic equipment console for a vehicle in accordance with the present invention showing electrical components which may be used therewith.

For some uses, such as with a SLAMRAAM Fire Unit for launching missiles from a HMMWV vehicle using a SCORPION configured laptop 34, FIG. 6, the laptop can be removable so that the operator can exit the vehicle and remain at a distance therefrom while still maintaining the ability to launch missiles from the HMMWV. To keep the laptop (computer or other electronic equipment) removably in place on laptop rack 20, clamps 32, quick-release mounts or other such means may be used. A cable or other electrical connecting means (not shown) is utilized to establish the connection between the HMMWV fixed-in-place equipment and the laptop, after the operator leaves the vehicle and laptop 34 is removed.

Also as shown in FIG. 6, other electronic equipment 36 and associated connections may be placed on laptop rack 20 as desired, depending on the size of laptop rack 20 which may be varied according to a particular application or need.

It is not unusual that in some situations, such as use of a laptop with the SLMRAAM Fire Unit, that the interior cab of the vehicle is filled with various types of equipment 40 and 42 near or under console 10. In such cases, the importance of placement and orientation of console 10 becomes even more readily apparent. In addition, console 10 of the subject invention does not prevent access to the HMMWV engine compartment underneath.

Figure 7:
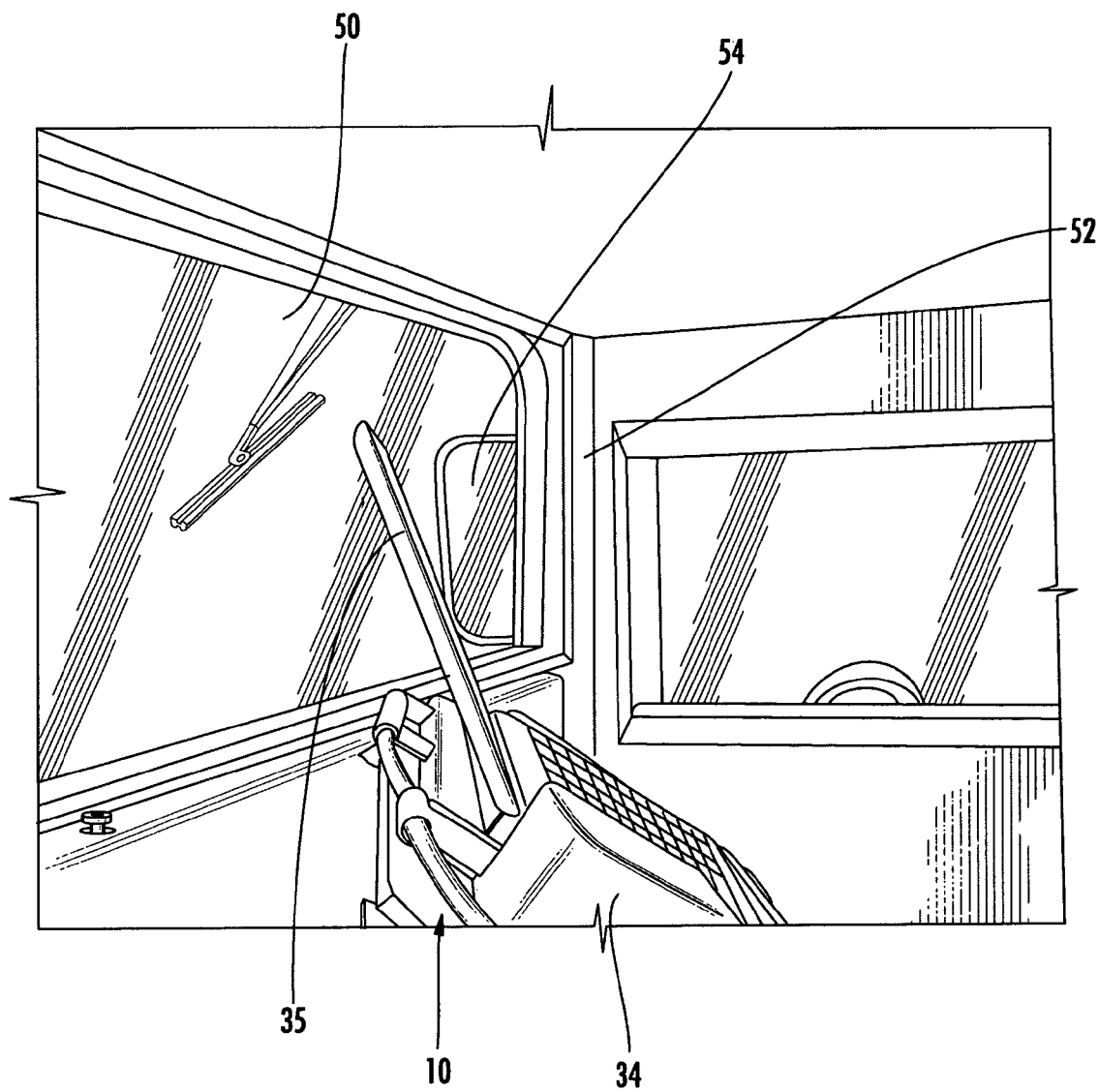
FIG. 7 is a schematic perspective view of an electronic equipment console for a vehicle in accordance with the present invention as shown from within the interior of a vehicle.

As discussed above, electronic equipment vehicle console 10 in accordance with the subject invention meets the requirements of ease of accessibility to the laptop or other electronic equipment, as well as ready egress from (and ingress to) the vehicle. Further, it maintains good visibility outside from vehicle operator's seat (in a U.S. vehicle), as shown for example in FIG. 7. In this view from the U.S. driver's perspective of a HMMWV vehicle, it can be seen that laptop 34 on console 10 does not interfere with visibility to any significant extent. In fact, regardless of the driver's position, screen portion 35 of laptop 34 may be adjusted to increase visibility. For example, screen 35 may be adjusted in order to align it with fording stack 50 or HMMWV "A" pillar 52 such that there is virtually no decrease in visibility. In addition, curb side-view mirror 54 may be adjusted. Further, although drivers may vary in size and seat positions may be changed, it is important to note that the view shown in FIG. 7 is not stereoscopic, unlike the view of most if not all vehicle drivers. When stereoscopic vision is taken into account, it is clear that even this minimal interference from screen 35 is even further decreased, if it interferes at all. Further, it can be seen that for non-U.S. vehicles where drivers and front seat passengers are reversed, the laptop rack of this invention would work equally well by reversing its location and orientation to correspond to the reversed driver and passenger locations, all while still within the purview and parameters of the subject invention.

Thus, even considering drivers of different sizes and a variety of vehicle seat positions, the electronic equipment vehicle console of the present invention provides an improved vehicle console for mounting electronic equipment such as a laptop computer. The console of the present invention makes the equipment more easily accessible to the passenger and driver, is less cumbersome, and provides for improved egress from the vehicle, better visibility, and increased safety.

Although specific features of the invention are shown in some drawings and not in others, this is for convenience only as each feature may be combined with any or all of the other features in accordance with the invention. The words "including", "comprising", "having", and "with" as used herein are to be interpreted broadly and comprehensively and are not limited to any physical interconnection. Moreover, any embodiments disclosed in the subject application are not to be taken as the only possible embodiments. Other embodiments will occur to those skilled in the art and are within the following claims.

In addition, any amendment presented during the prosecution of the patent application for this patent is not a disclaimer of any claim element presented in the application as filed: those skilled in the art cannot reasonably be expected to draft a claim that would literally encompass all possible equivalents, many equivalents will be unforeseeable at the time of the amendment and are beyond a fair interpretation of what is to be surrendered (if anything), the rationale underlying the amendment may bear no more than a tangential relation to many equivalents, and/or there are many other reasons the applicant can not be expected to describe certain insubstantial substitutes for any claim element amended.

What is claimed is:

1. An electronic equipment console for a vehicle comprising:
    an equipment shelf defining a plane;
    an angled bracket supporting said equipment shelf, and legs for additional support of said shelf; and
    a laptop rack supported by right and left forward posts and left and right spaced posts rearwardly of said forward posts, said left rearwardly spaced post extending between the laptop rack and the equipment shelf and said right rearwardly spaced post extending between the laptop rack and the bracket, in which the left rearwardly post is longer than the left forward post, the left forward post is shorter than the right rearwardly post, and the left rearwardly post is forward of the right rearwardly post to orient the laptop rack relative to the bracket and the defined plane.

2. The electronic equipment console of claim 1 in which said bracket extends rearwardly from said shelf and is at an upward angle with respect to said plane.

3. The electronic equipment console of claim 1 in which the equipment shelf is supported by one or more legs.

4. The electronic equipment console of claim 3 in which there are two front legs.

5. The electronic equipment console of claim 1 in which said plane is horizontal.

6. The electronic equipment console of claim 1 in which said shelf has a side extension portion for supporting said laptop rack.

7. The electronic equipment console of claim 1 in which said laptop rack includes a mounting pad thereon.

8. The electronic equipment vehicle of claim 1 in which said laptop rack is at an upward and rearward angle of between 18.8° and 28.8° relative to said plane.

9. The electronic equipment vehicle of claim 1 in which said plane is defined by x and y axes, and said laptop rack is at an angle of between 34.4° and 44.4° with respect to one of said x and y axes.

10. The electronic equipment vehicle of claim 1 in which said laptop rack is at a tilt angle of between 2.1° and 12.1° relative to said plane.

11. The electronic equipment console of claim 1 in which the laptop rack front portion is above said equipment shelf.

12. The electronic equipment console of claim 1 in which the center of the lap top rack is configured to be above a seat pan of the vehicle between 11.6 inches and 18.6 inches.

13. The electronic equipment console of claim 12 in which the seat pan is the vehicle operator seat pan.

14. The electronic equipment console of claim 1 in which the laptop rack is fixed with respect to the equipment shelf.

15. The electronic equipment console of claim 1 in which the laptop rack further includes clamps for securing a laptop computer to the laptop rack.

* * * * *